(12) United States Patent
Poudrier

(10) Patent No.: US 8,985,418 B1
(45) Date of Patent: Mar. 24, 2015

(54) CONVERTIBLE CARGO CARRIER CART SYSTEM

(71) Applicant: Alan Stanley Poudrier, Niceville, FL (US)

(72) Inventor: Alan Stanley Poudrier, Niceville, FL (US)

(*) Notice: Subject to any disclaimer, the term of this patent is extended or adjusted under 35 U.S.C. 154(b) by 0 days.

(21) Appl. No.: 14/059,006

(22) Filed: Oct. 21, 2013

(51) Int. Cl.
B60R 9/00 (2006.01)
B60D 1/24 (2006.01)
B60R 3/00 (2006.01)
B62H 3/00 (2006.01)

(52) U.S. Cl.
CPC ... *B60R 9/00* (2013.01); *B60D 1/24* (2013.01); *B60R 3/007* (2013.01); *B62H 3/00* (2013.01)
USPC .......................................................... 224/521

(58) Field of Classification Search
USPC ......... 224/519–526, 484, 488, 498, 504, 511, 224/924
See application file for complete search history.

(56) References Cited

U.S. PATENT DOCUMENTS

| | | | | |
|---|---|---|---|---|
| 4,593,840 A * | 6/1986 | Chown | ............................ | 224/520 |
| 4,744,590 A * | 5/1988 | Chesney | ........................ | 280/769 |
| 5,011,361 A * | 4/1991 | Peterson | ........................ | 414/462 |
| 5,586,702 A * | 12/1996 | Sadler | ............................ | 224/521 |
| 6,006,973 A * | 12/1999 | Belinky et al. | ................. | 224/510 |
| 6,139,029 A * | 10/2000 | Shaw | .................................. | 280/8 |
| 6,345,750 B1 * | 2/2002 | McCoy et al. | ................. | 224/525 |
| 6,550,791 B2 * | 4/2003 | Ramsey | ...................... | 280/47.19 |
| 6,846,017 B2 * | 1/2005 | Martin | ........................... | 280/769 |
| 7,963,530 B1 * | 6/2011 | Garcia | ............................ | 280/30 |
| 8,465,031 B2 * | 6/2013 | Coghill, Jr. | ................... | 280/79.3 |
| 2002/0005423 A1 * | 1/2002 | Grover | ........................... | 224/509 |
| 2003/0173387 A1 * | 9/2003 | Mitchell | ........................ | 224/499 |
| 2004/0123529 A1 * | 7/2004 | Wiese et al. | ......................... | 52/6 |
| 2008/0206030 A1 * | 8/2008 | Reuille et al. | ................. | 414/462 |
| 2008/0240897 A1 * | 10/2008 | Miro et al. | ..................... | 414/462 |
| 2010/0102524 A1 * | 4/2010 | Larsen et al. | .................... | 280/35 |

* cited by examiner

Primary Examiner — Brian D Nash

(57) ABSTRACT

A lightweight convertible cargo carrier cart system and accessories adaptable for transporting articles using a vehicle's receiver hitch, or wheeled hand cart, or trailer (pulled via a bicycle or other device). Users can select appropriate components to manage loads based on the available method for transporting the load. Accessories include a handle accessory, a leg/foot accessory, and inserts (for attaching wheels, hardware, and accessories). When the convertible cargo carrier and cart system is used as a cart the user is afforded a variety of positions for installing inserts and wheels based on the weight, mass, and distribution of the load.

4 Claims, 8 Drawing Sheets

CONVERTIBLE CARGO CARRIER CART SYSTEM

BACKGROUND OF THE INVENTION

1. Field of the Invention

The present invention relates to a device that may be received within a typical square hitch receiver found on a vehicle, wherein the device holds articles for transport and, wherein the device may hold articles and transport articles when utilized as a hand cart (it may be used independently as a manually operated cart without being inserted into a typical hitch receiver found on a vehicle) and, wherein the device may hold articles and transport articles when utilized as a trailer.

2. Background of the Prior Art

Current devices that are designed to be used as receiver hitch cargo carriers for transporting loads or articles are generally intended for a singular method of managing the load. A typical vehicle receiver hitch cargo carrier is stored in the garage until it is needed on rare occasions to transport loads that do not fit within a vehicle's compartments. Attempts to expand the limitations of the typical cargo carriers by transforming the cargo carriers to enable it to perform dual purposes such as a wheeled dolly or a wagon are evident in some examples of prior art. While some examples of prior art are more effective and versatile than the typical cargo carrier, such examples are not without their limitations. The individual who uses a receiver hitch cargo carrier in the capacity of a wheeled dolly or cart will typically need other devices to manage a variety of load and article transporting objectives. There is a need for a system that enables a single device to be adapted in order to meet a wide range of cargo and/or article handling, storage, and transportation objectives that are not limited to but include: a vehicle receiver hitch cargo carrier, a pickup truck bed extender, a vehicle receiver hitch bicycle carrier, a tailgate grill, a beach or pier fishing cart, a game (hunting) cart, a yard-work cart, a bicycle trailer, and other user defined necessities.

This invention expands the usefulness of receiver hitch cargo carriers and manually transported carts by providing a convertible cargo carrier and cart system that affords the ability to add vertical receivers and inserts to the platform of the cargo carrier and allow the user to adapt the convertible cargo carrier and cart system in order to provide a better means of managing a variety of cargo handling, cargo storage, and cargo transporting objectives. While utilizing the convertible cargo carrier and cart system in the capacity of a receiver hitch cargo carrier vertical inserts can be inserted in the cargo carrier wherein the vertical inserts can be adapted to support articles while transporting articles. The vertical inserts can also be used to define and contain the length and width of a load while also providing a means to secure articles thereby offering improved methods to manage the cargo or article handling objectives. The vertical inserts can further be used while the vehicle is in a stationary position to support articles such as a tailgate grill or other devices.

A handle accessory can be stowed inside the cargo carrier's framework wherein the handle reinforces the strength of the cargo carrier's receiver tube when it is in the stowed position. A leg/foot accessory can also be stowed within the cargo carrier's framework without impacting the area that is designated for the load, wherein a tongue component of the handle accessory is designed to secure the leg/foot accessory in the stowed position while utilizing the convertible cargo carrier and cart system in the capacity of a receiver hitch cargo carrier.

The cargo carrier, vertical inserts, and accessories can be easily removed from a vehicle's receiver hitch wherein the convertible cargo carrier and cart system is easily converted to a manually controlled cart for a wide variety of applications.

SUMMARY OF THE INVENTION

The convertible cargo carrier and cart system holder of the present invention addresses the aforementioned needs in the art by providing a cargo carrier wherein accessories can be attached to and stored within the cargo carrier's framework and platform and article supports can be added to the perimeter sides of the cargo carrier's platform. A handle accessory, appropriate hardware, and article supports can be used for managing and transporting loads when using the cargo carrier as a manually operated cart. The device can also be secured to the trailer hitch of a vehicle wherein the user can select appropriate accessories to manage and transport articles or loads via a motorized vehicle. Additionally, the cargo carrier can be easily converted to a bicycle trailer wherein the handle accessory can be used to secure the cargo carrier to a bicycle receiver (not shown) wherein the user can select appropriate accessories to manage and transport articles or loads via a bicycle.

The convertible cargo carrier and cart system is of relatively simple design and construction, being produced using standard manufacturing techniques, so as to be relatively inexpensive to produce so as to be economically attractive to potential consumers of this type of device.

The convertible cargo carrier and cart system of the present invention is comprised of a horizontal receiver tube that is affixed to a generally rectangular shaped platform wherein the platform has a top (upper) side and a bottom (under) side and four perimeter sides. The platform having rows of rectangular shaped vertical receivers on the perimeter sides and the platform also having framework receivers built within the underside of the platform.

The user can utilize common hardware to attach preferred wheels to vertical inserts and then install the vertical insert and wheel assembly into selected vertical receivers that are most suitable for managing the load. The handle assembly can be moved within the cargo carrier's receiver tube from a stowed position to a position that allows the pivot-able assembly of the handle to be rotated to a vertical position which allows the user to control the cart while in a standing or walking position. The leg/foot accessory can also be pivoted to a vertical position to support the cargo carrier in a rest position.

The convertible cargo carrier and cart system is designed in such a manner that encourages the development of accessories that further expand the usefulness of the system by addressing the needs of additional applications without departing from the spirit and scope of the present invention. One such example of expanding the usefulness of the convertible cargo carrier and cart system is the design of the fishing rod holders that are part of the present invention.

BRIEF DESCRIPTION OF THE DRAWINGS

Similar reference numerals refer to similar parts throughout the several views of the drawings.

DESCRIPTION OF THE PREFERRED EMBODIMENT

Figure 1:
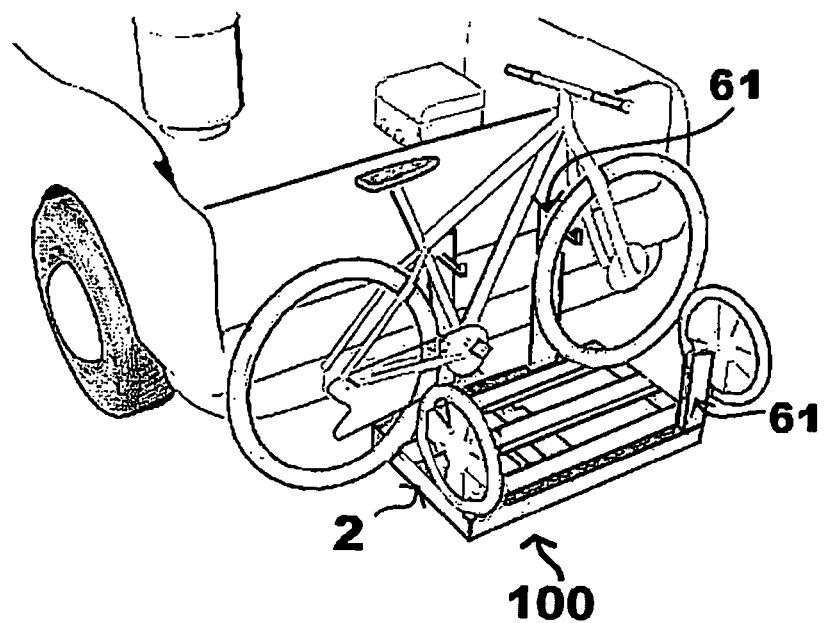
FIG. 1 is an environmental view of the convertible cargo carrier and cart system of the present invention employed as cargo carrier for transporting articles with vertical inserts and a bicycle secured thereto.
Figure 2:
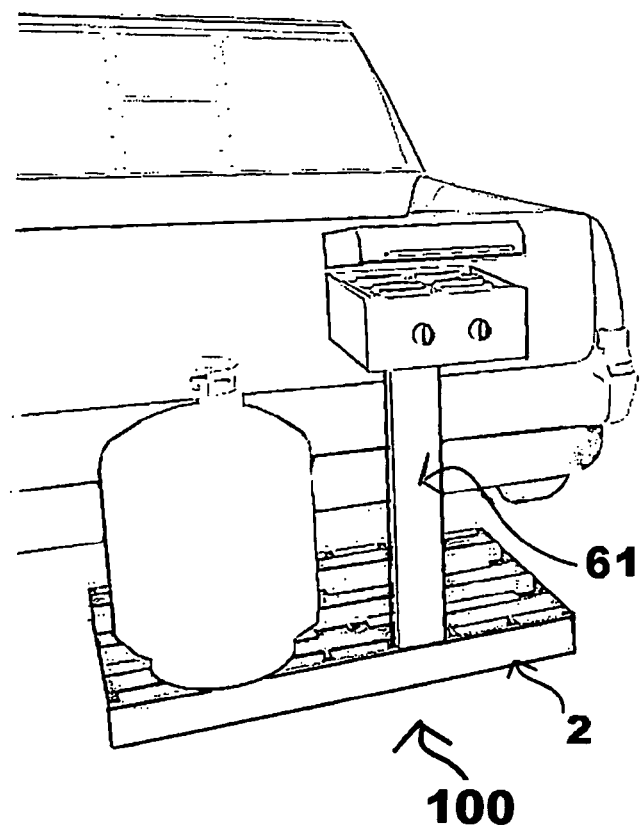
FIG. 2 is an environmental view of the convertible cargo carrier and cart system of the present invention with vertical inserts and a grill secured thereto.
Figure 3:
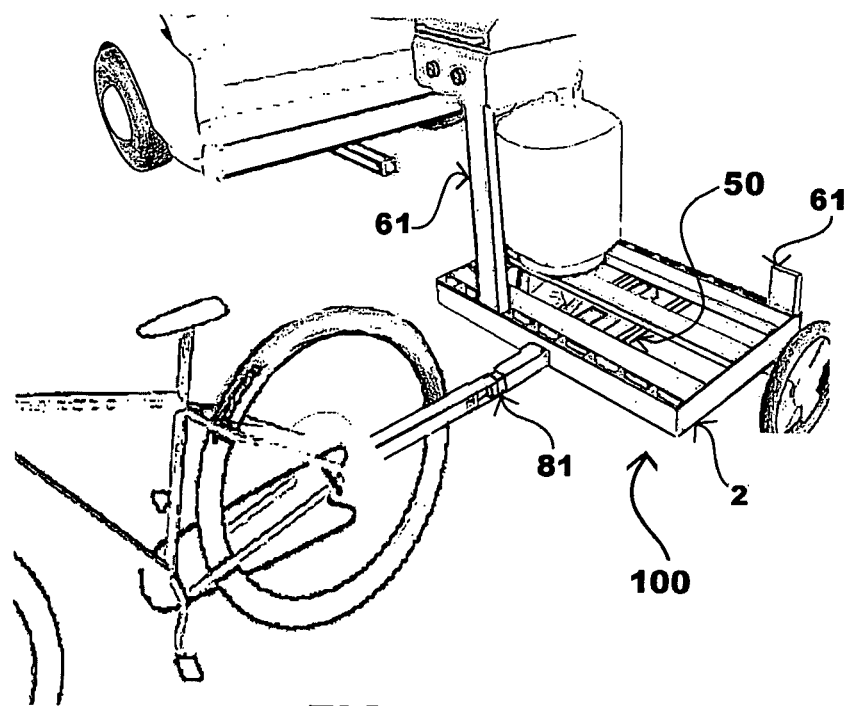
FIG. 3 is an environmental view of the convertible cargo carrier and cart system of the present invention employed as a bicycle trailer.
Figure 4:
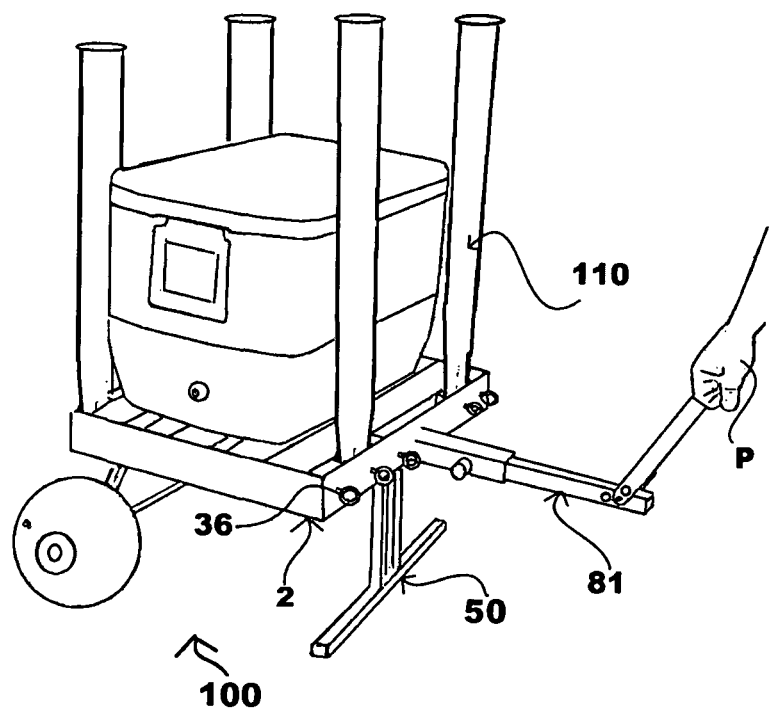
FIG. 4 is an environmental view of the convertible cargo carrier and cart system of the present invention employed as a fishing cart with fishing rod holders secured thereto.
Figure 5:
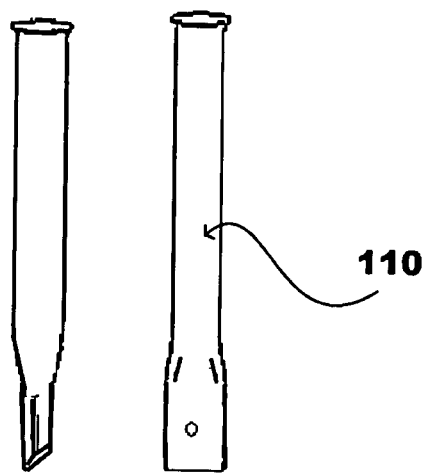
FIG. 5 is a perspective view of the fishing rod holders of the present invention.
Figure 6:
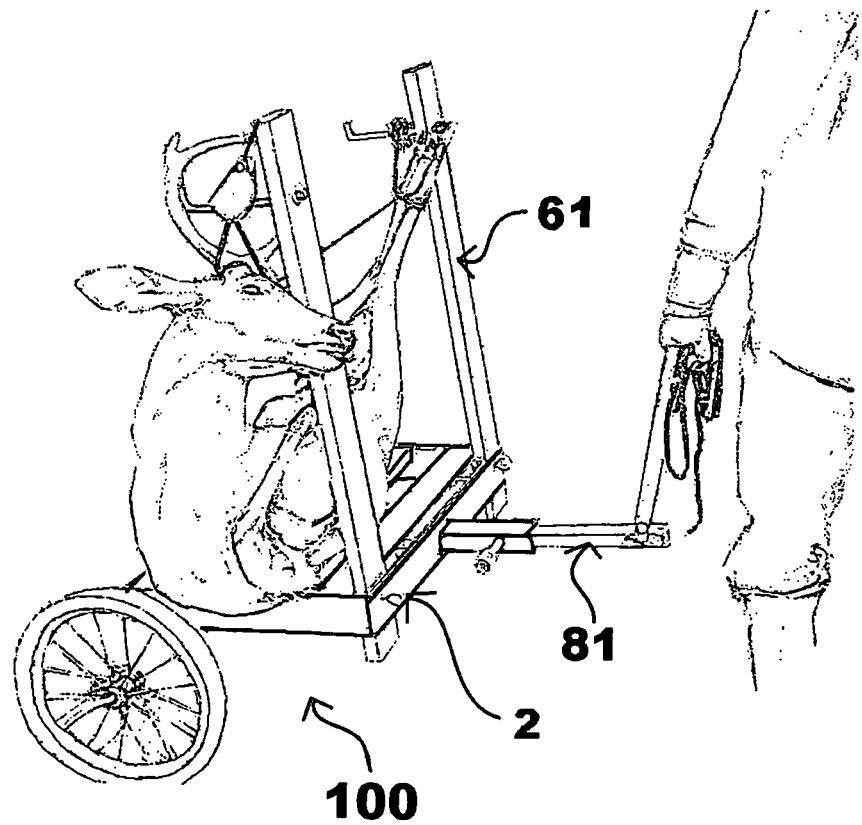
FIG. 6 is an environmental view of the convertible cargo carrier and cart system of the present invention employed as a hunting cart with game thereto.
Figure 7:
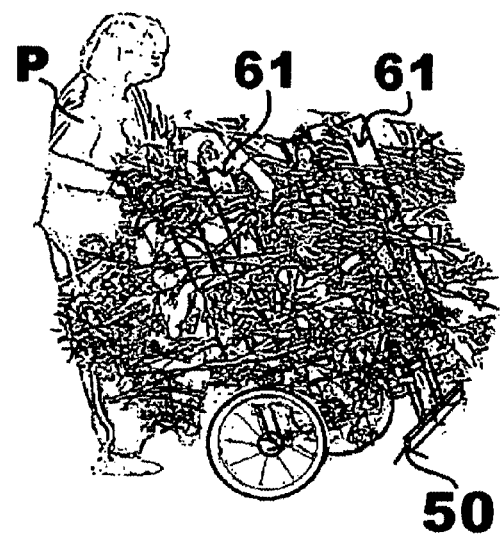
FIG. 7 is an environmental view of the convertible cargo carrier and cart system of the present invention employed as a cart for hauling branches and yard debris.
Figure 8:
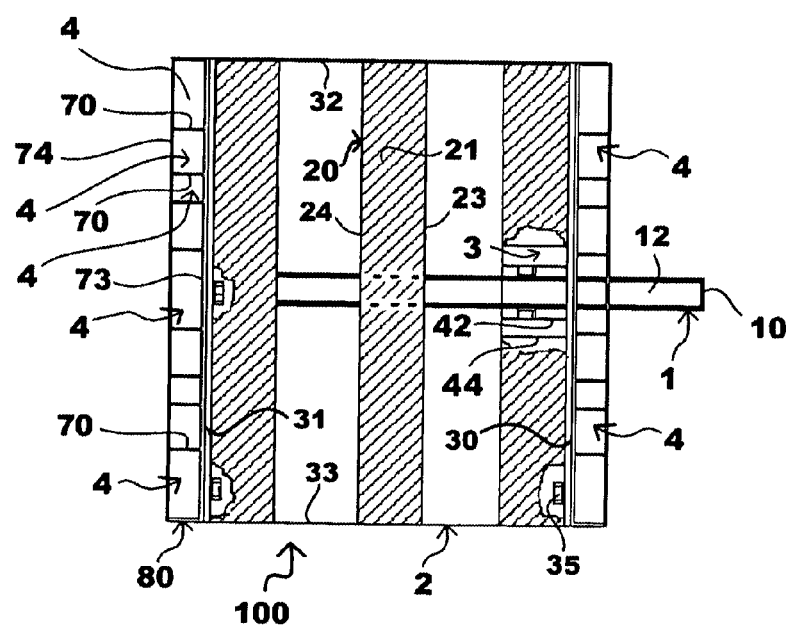
FIG. 8 is a perspective view of the top side of the cargo carrier of the present invention.
Figure 9:
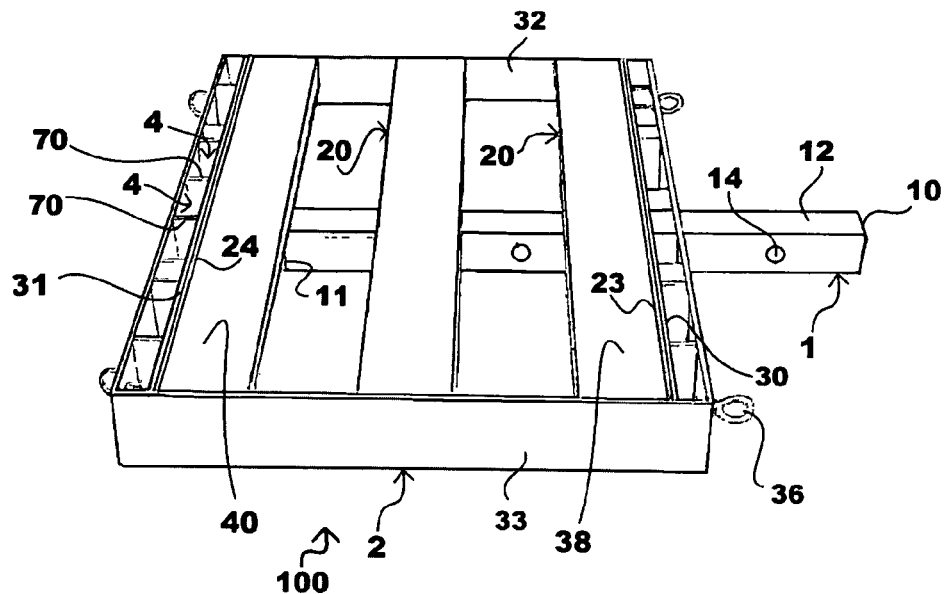
FIG. 9 is a perspective view from the right side of the cargo carrier of the present invention.
Figure 10:
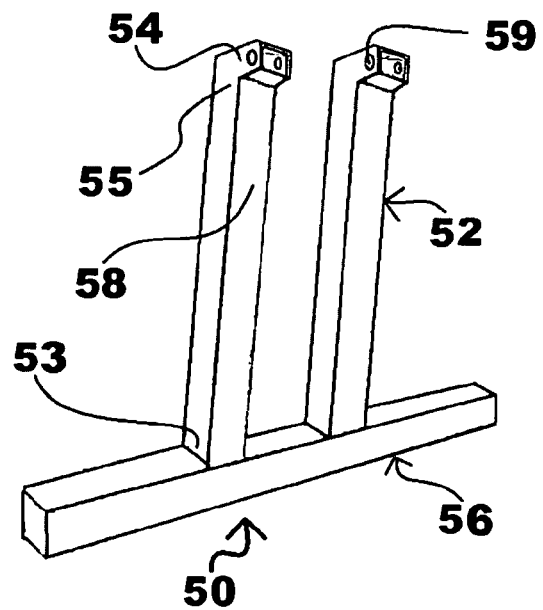
FIG. 10 is a perspective view of the leg/foot accessory of the present invention.
Figure 11:
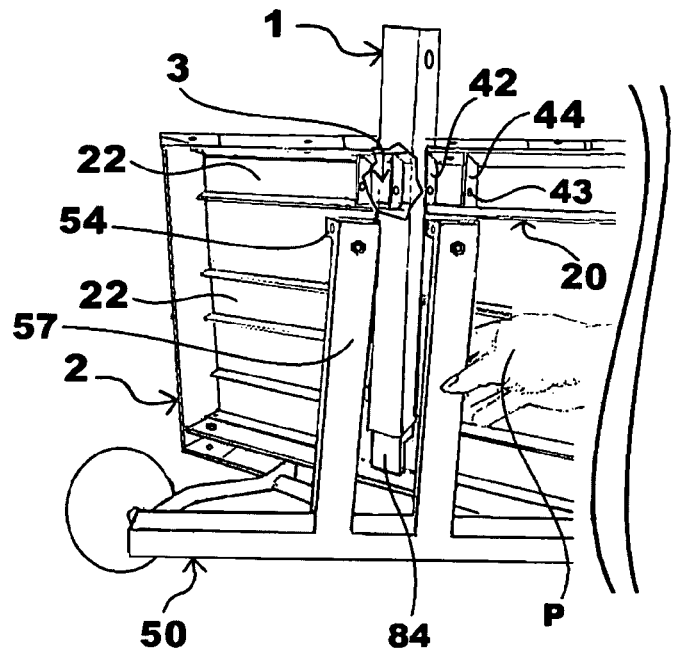
FIG. 11 is a perspective view of the leg/foot accessory and the underside-view of the cargo carrier of the present invention.
Figure 12:
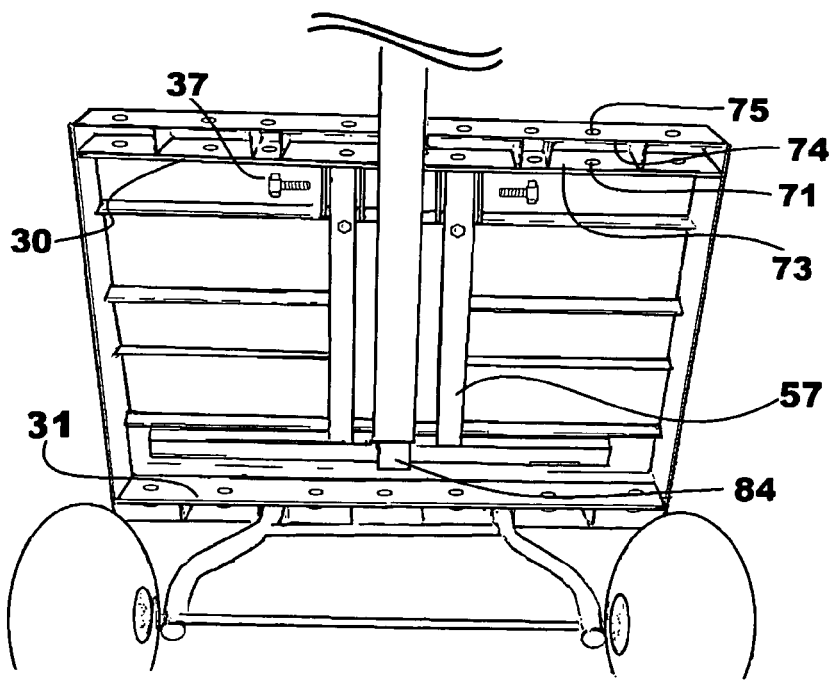
FIG. 12 is a perspective view of the leg/foot accessory installed on the cargo carrier of the present invention.
Figure 13:
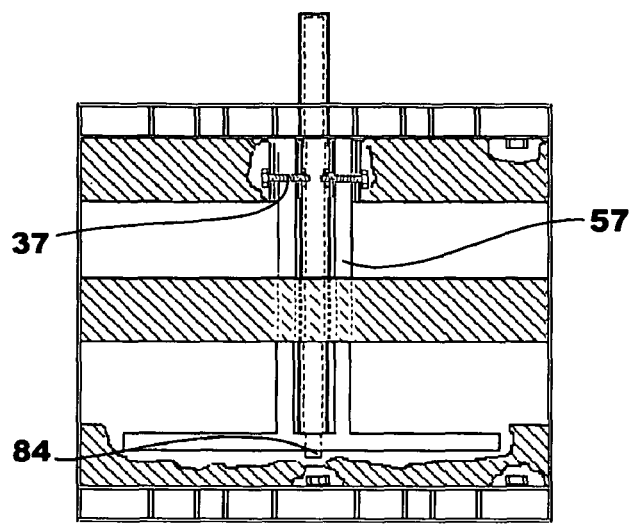
FIG. 13 is a perspective view from the top of the cargo carrier of the present invention with the leg/foot accessory installed.
Figure 14:
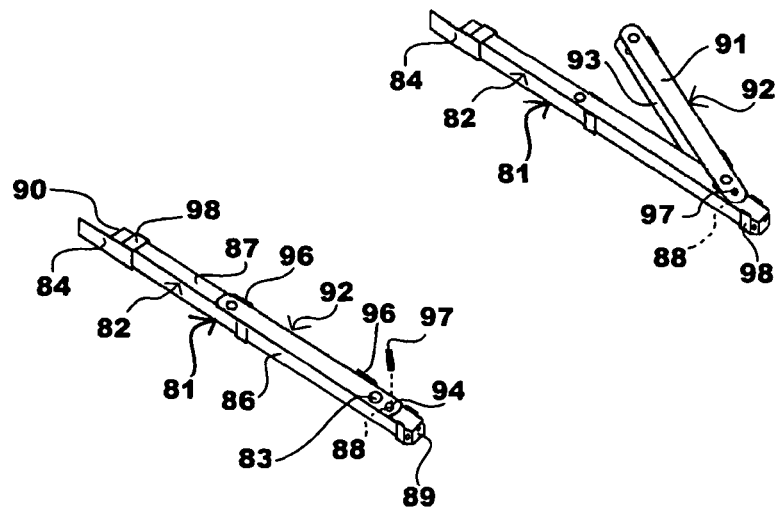
FIG. 14 is a perspective view of the handle accessory's pivot-able assembly's motion of the present invention.
Figure 15:
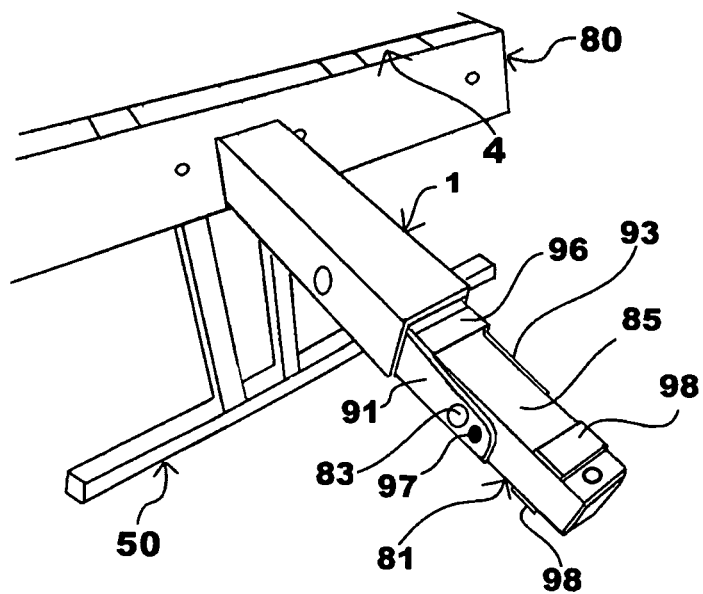
FIG. 15 is a perspective view of the handle accessory inserted into the cargo carrier of the present invention.
Figure 16:
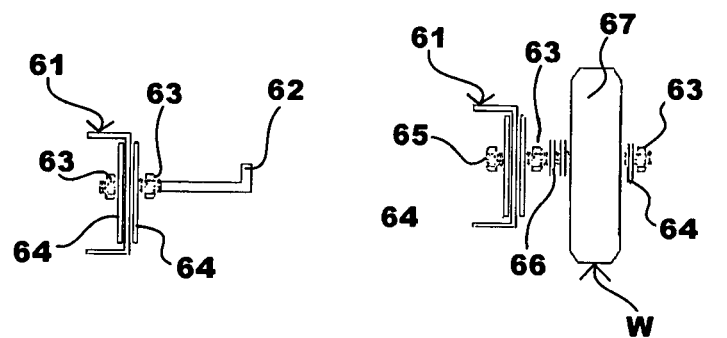
FIG. 16 is a perspective view of the vertical inserts of the present invention illustrating a variety of hardware and wheel configurations.
Figure 16:
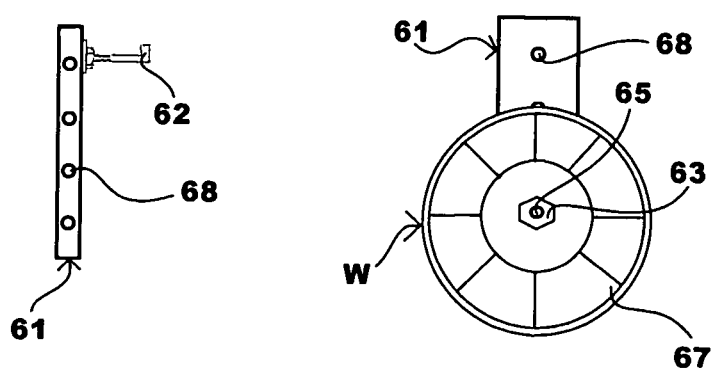

Referring now to the drawings, it is seen that the convertible cargo carrier and cart of the present invention, generally denoted by reference numeral 100 is comprised of a horizontal-receiver component 1, a platform 2, frame work receivers 3, and vertical receivers 4. The convertible cargo carrier and cart 100 can be used to transport articles as a hand cart with wheel assemblies W. The convertible cargo carrier and cart 100 may also be used to transport articles via a vehicle V receiver hitch cargo carrier when the convertible cargo carrier and cart 100 is inserted into a vehicle receiver hitch.

The platform 2 is comprised of a plurality of channel stock components 20, each channel component having an upper side 21 and an under side 22, a front surface 23 and a rear surface 24. The platform 2 also having a front side 30, a rear-side 31, a left-side 32 and right-side 33. The four sides (30, 31, 32 and 33) of the platform 2 are comprised of flat-bar stock. Each side (30, 31, 32 and 33) of the platform 2 has a plurality of vertical receiver securement holes 34. Securement nuts 35 may be aligned with vertical receiver securement holes 34 and securement nuts 35 may be bonded, welded, or molded to the inner sides of the four sides (30, 31, 32 and 33) on the underside of the platform 2.

The front surface 23 top edge of channel component 38 is bonded to the top edge of the platform's front flat-bar stock component 30 at the top edge of 30. The rear surface 24 top edge of channel component 40 is bonded to the platform's rear flat-bar stock component 31 at the top edge of 31.

The front surface 23 underside 22 edge and the rear surface 24 underside edge 22 of channel component 38 are bonded to the upper surface 12 of the horizontal-receiver component 1. The front surface 23 under side 22 edge of channel component 40 is bonded to the upper surface 12 of the horizontal-receiver component 1 at the second end 11 of the horizontal-receiver component 1. A void space is established between the second end 11 of the horizontal-receiver component 1 and the rear-side 31 of the platform 2. The void space is approximately equal to the width of channel component 40. This void provides stowage space for the foot section of the leg assembly in the underside of the convertible cargo carrier and cart 100.

The bottom edge of front surface 23 has a cut-out that is approximately two inches by two inches at the mid-point of the front surface 23 which allows the front surface 23 to fit over the upper surface 12 of the horizontal-receiver component 1, thus the height of the convertible cargo carrier and cart 100 is the combined height of the horizontal-receiver component 1 and platform 2.

Framework receivers 3 are comprised of flat-bar stock material. One piece of flat-bar stock material is used to construct a first side 42 of a framework-receiver and a second piece of flat-bar stock material is used to construct a second side 44 of a framework-receiver. The first side 42 and the second side 44 are each equal in length to the inside width of the under-side 22 of channel stock components 20. The first side 42 is separated from the second side 44 by a distance that is approximately 0.0125 inches wider than the square tube stock extension member 54 of the leg unit 52 which is used to construct the leg/foot accessory 50. An accessory-support securement hole 43 passes through the framework receivers from the first side 42 to the second side 44. Securement nuts 35 may be affixed to either the first side 42 or the second side 44 of the framework-receiver.

Vertical receivers 4 are comprised of a rectangular tube stock. The length of the rectangular tube stock used for each vertical-receiver 4 is equal to the height of the platform 2. Two adjacent vertical receivers 4 share a common divider 70. Adjacent vertical receivers 4 are bonded, welded, or molded at each common divider 70. Each vertical-receiver 4 has a platform-side 73 that is adjacent to the platform 2 and also an opposing side 74. A securement opening 71 is located on platform-side 73 and a corresponding securement opening 71 is located on the opposing side 74 of each vertical-receiver 4. Securement openings 71 align with vertical receiver securement holes 34 on the platform 2. A plurality of vertical receivers 4 forms a vertical receivers row 80. A row of vertical receivers 80 may be affixed to one or more perimeter sides of the platform 2. A user P can pass common hardware (eyebolts shown) 36 through each vertical-receiver 4 and also through the platform 2 to secure the vertical-receiver(s) 4 to the platform 2. Common hardware 36 may also be used to secure vertical inserts 61 to the convertible cargo carrier and cart 100.

Vertical inserts 61 are comprised of channel stock material, rectangular stock tubing, or square stock tubing. User P can select a securement hole 68 and insert appropriate common hardware to attach wheels 67 to a vertical insert as demonstrated with a spindle-bolt 65, flat washer's 64, spacers 66, and cotter pins or locking nuts 63. The vertical insert and wheel assembly W can be inserted to a selected height and the convertible cargo carrier and cart 100 may be used to transport articles or user goods as necessary. User P can select other appropriate hardware as demonstrated with J-bolts 62, flat washers 64, spacers 66, and locking nuts 63 to support and transport articles as necessary. The convertible cargo carrier and cart 100 becomes a beach fishing cart when fishing rod holders 110 and appropriate beach wheel assemblies W are inserted into vertical receivers 4.

A leg/foot accessory 50 is constructed using square tube stock. The leg/foot accessory 50 is comprised of leg members 52, extension members 54 and a foot member 56. Each leg member 52 has a foot-end 53 and a top-end 54. The foot-end 53 of each leg member 52 is affixed to the foot member 56 equidistant from the center of the foot member 56. Extension members 54 are attached to the top-end 55 of the leg members 52 at a right angle to the rear-side 58 of leg member 52.

Each extension member 54 of the leg/foot accessory 50 has a hole 59 passing through the extension member 54 from the left-side to the right-side of the leg member 52 providing a means to pass a bolt 37 through a framework-receiver 3 and also through the leg/foot accessory 50 in order to attach the leg/foot accessory 50 to underside 22 of a channel component 20 of the platform 2. The leg/foot accessory 50 can be pivoted to a vertical position to support the convertible cargo carrier and cart 100 or it can be pivoted horizontally and stowed within the underside of the platform 2 of the convertible cargo carrier and cart 100.

A handle assembly 81 is comprised of a strength member 82; a pivot-able member 92; and a tongue component 84. The strength-member 82 having a top-side 85, a bottom-side 86, a right-side 87 and an opposing a left-side, a front-end 89 and an opposing rear-end 90. A plurality of flat-bar spacer-members 98 are affixed to the strength member 82 on each side of the strength member 82. The spacer-members 98 create a snug fit between the outer dimension of the strength member 82 and the inner dimension of the horizontal-receiver component 1 of the convertible cargo carrier and cart 100. The strength member 82 has a pivot-hole 88 that has a slightly larger diameter than the diameter of the pivot-pin 97 comprised of round stock material.

The pivot-pin 97 is passed through the pivot-hole 88 of the strength member 82. The pivot-pin 97 extends approximately 0.125 inches beyond the right-side 87 of the handle assembly's strength member 82 and also extends approximately 0.125 inches beyond the left-side (not shown) strength member 82.

The pivot-able member 92 of the handle assembly 81 is comprised of a right flat-bar component 91, a left flat-bar component 93, and flat-bar spacer-members 96. The right flat-bar component 91 of pivot-able member 92 and the left flat-bar component 93 of the pivot-able member 92 each have a pivot-pin hole 94 that is equal in diameter to the diameter of the pivot-pin 97. The pivot-pin hole 94 on the right flat-bar component 91 is pressed tightly into the pivot-pin hole 94 and the pivot-pin hole 94 on the left flat-bar component 93 is pressed tightly onto the pivot-pin 97 in parallel position to right flat-bar component 91 and also in parallel position to the strength member 82. Flat-bar spacer-members 96 are affixed to the top side of pivot-able member 92 in such size and manner that when the pivot-able member 92 is pivoted to a stowed position against the top-side 85 of the handle assembly's strength member 82 the user P can then insert the handle assembly 81 into the horizontal-receiver component 1 of the convertible cargo carrier and cart 100.

A handle assembly receiver hitch-pin hole 83 passes through the handle assembly 81, through the right flat-bar component 91 of pivot-able member 92, the strength member 82, and also through the left flat-bar component 93 of the pivot-able member 92. A handle assembly receiver hitch pin-hole 83 aligns with the receiver hitch pinhole 14 of the horizontal-receiver component 1 of the cargo carrier convertible cargo carrier and cart 100.

A handle pinhole 95 also passes through the handle assembly 81, through the right flat-bar component 91 of pivot-able member 92, the strength member 82, and also through the left flat-bar component 93 of the pivot-able member 92. The handle pinhole 95 allows the user P to insert a pin, bolt, or strap through the handle pinhole 95 to provide a comfortable grip when using the convertible cargo carrier and cart 100 in a variety of preferred applications.

While the invention has been particularly shown and described with reference to embodiments thereof, it will be appreciated by those skilled in the art that various changes in form and detail may be made without departing from the spirit and scope of the invention.

I claim:

1. A receiver hitch cargo carrier comprising: a horizontal-receiver; a generally rectangular shaped platform; a plurality of vertical receivers; and a plurality of framework receivers; wherein, the horizontal-receiver provides a means to insert and secure the receiver hitch cargo carrier into a vehicle receiver hitch tube, and wherein, the horizontal-receiver serves as a receiver tube for a handle accessory of the receiver hitch cargo carrier when used as a cart system, wherein, the rectangular shaped platform has a top (upper) side and a bottom (under) side; the platform also having a front side, a rear side, a left side, and a right side (four perimeter sides), wherein the four perimeter sides of the platform are comprised of stock flat-bar material pieces that are equal in length to the respective side of the platform and equal in height to the height of the platform and; wherein, the platform's upper side is comprised of a plurality of channel members, wherein each channel member having an upper side (flat surface) and an under-side (channel shape), wherein the horizontal-receiver tube is positioned below and adjacent to the under-side edges of the platform's channel members in such position that the overall height of the receiver hitch cargo carrier is neither increased nor decreased by the combined height of the platform and the horizontal-receiver tube; and wherein the plurality of framework receivers are affixed to the under-side of the platform's channel members, wherein each of the framework receivers serves as a socket that allows the user to attach accessories onto the underside of the platform; and wherein each vertical-receiver has a bottom opening and an opposing top opening, four interior sides, and four exterior sides, wherein the vertical receivers are joined in such fashion that any two vertical receivers share a common divider (one interior side of a first vertical-receiver is the exterior side of a second vertical-receiver and the opposing exterior side of the second vertical-receiver is the interior side of a third vertical-receiver, and subsequent vertical receivers combine in similar fashion to form a row of vertical receivers), wherein a row of vertical receivers may be affixed to one or more perimeter sides of the cargo carrier in such position that the bottom edge of the vertical receivers and the bottom of the platform are generally on an equal horizontal plane and, wherein the top edge of the vertical receivers and the top of the platform are generally on an equal horizontal plane such that the overall height of the receiver hitch cargo carrier is neither increased nor decreased by the combined height of the platform and the vertical receivers, wherein the horizontal-receiver extends rearward within the framework of the platform (on the underside) to a length that is approximately three inches short of reaching the platform's rear-side, wherein a void space below the under-side of the rear channel member is intended for storage of a foot component when the receiver hitch cargo carrier is combined with a leg/foot accessory installed into the platform's framework receivers and pivoted to a stowed position.

2. The receiver hitch cargo carrier of claim 1, wherein a leg/foot accessory can be attached to the framework-receiver comprising: one or more leg units, a foot component, and leg extension pieces; and, wherein each extension piece of the leg/foot accessory can be inserted into a socket of a framework-receiver of the receiver hitch cargo carrier, wherein, the leg/foot accessory can be attached to the under-side of the platform utilizing common hardware, wherein the leg/foot accessory can be pivoted to a vertical position to support the cargo carrier platform: and wherein the leg/foot accessory can be pivoted to a stowed position (with the leg component in a horizontal position).

3. The receiver hitch cargo carrier of claim 1, wherein a handle accessory can be used therewith comprising: a strength-member; a tongue component; a pivot-pin; and a pivot-able assembly; and wherein the strength-member of the handle accessory is approximately equal to the length of the horizontal-receiver tube, wherein the tongue component is affixed to the strength-member, wherein the combined length of the strength-member and the tongue component is approximately three inches greater than the length of the strength member, wherein the handle accessory's pivot-pin passes the handle accessory's strength-member, wherein the handle accessory's pivot-able assembly is affixed to the pivot-pin on each side of the strength-member, wherein the pivot-able assembly may be pivoted to the stowed position against the top of the strength-member of the handle assembly, wherein handle accessory with the pivot-able assembly pivoted to the stowed position wherein the full length of the handle accessory can be inserted into the horizontal-receiver tube, wherein handle accessory's pivot-able assembly can be pivoted to a vertical position, wherein the handle assembly can be partially inserted into the horizontal-receiver tube, wherein the handle assembly can be utilized to manually control the cargo carrier when the cargo carrier is used in the capacity of a wheeled cart.

4. The receiver hitch cargo carrier of claim 1, wherein a fishing rod holder can be used therewith; wherein the fishing rod holder comprises molded tubing; and wherein the molded shape of the fishing rod holder transitions from round tubing to a rectangular shape approximately ten inches from the bottom end of the fishing rod holder, wherein the rectangular shape of the fishing rod holder is designed to be inserted into a vertical-receiver of the receiver hitch cargo carrier; and wherein the fishing rod holder also serves as a lightweight surf-fishing rod holder.

* * * * *